United States Patent
Neimark et al.

(10) Patent No.: US 12,429,696 B2
(45) Date of Patent: Sep. 30, 2025

(54) SYSTEM AND METHOD FOR REMOVING OBSTRUCTING OBJECTS IN A HEAD MOUNTED DISPLAY

(71) Applicant: Elbit Systems Ltd., Haifa (IL)

(72) Inventors: Vadim Neimark, Haifa (IL); Johai Amati, Haifa (IL); Sharon Kedem, Haifa (IL)

(73) Assignee: Elbit Systems Ltd., Haifa (IL)

( * ) Notice: Subject to any disclaimer, the term of this patent is extended or adjusted under 35 U.S.C. 154(b) by 0 days.

(21) Appl. No.: 18/447,589

(22) Filed: Aug. 10, 2023

(65) Prior Publication Data

US 2023/0384600 A1 Nov. 30, 2023

Related U.S. Application Data

(63) Continuation of application No. PCT/IL2022/050168, filed on Feb. 10, 2022.

(30) Foreign Application Priority Data

Feb. 11, 2021 (IL) .......................................... 280838

(51) Int. Cl.
*G02B 27/01* (2006.01)
*G06T 5/50* (2006.01)
(Continued)

(52) U.S. Cl.
CPC ............ *G02B 27/0172* (2013.01); *G06T 5/50* (2013.01); *G06T 7/11* (2017.01); *G06T 7/75* (2017.01); *G02B 2027/0138* (2013.01); *G02B 2027/014* (2013.01); *G02B 2027/0187* (2013.01); *G06T 2207/30268* (2013.01)

(58) Field of Classification Search
CPC ............ G02B 2027/0123; G02B 27/01; G02B 27/0172; G02B 2027/0138; G02B 2027/014; G02B 2027/0187; G06F 3/012; G06F 3/011; G06F 3/01; G06T 5/50; G06T 7/11; G06T 7/75; G06T 2207/30268
See application file for complete search history.

(56) References Cited

U.S. PATENT DOCUMENTS 5,299,063 A 3/1994 Fritz et al.
7,180,476 B1 * 2/2007 Guell ..................... H04N 7/181
348/148

(Continued)

*Primary Examiner* — Benyam Ketema
(74) *Attorney, Agent, or Firm* — PEARL COHEN ZEDEK LATZER BARATZ LLP

(57) ABSTRACT

A method and a system for displaying a scene to a user wearing ahead mounted display (HMD) while removing obstructions in a field of view (FOV) of the user are provided herein. The method may include: capturing by a sensor a vehicle image of the scene wherein the first sensor is mounted on the vehicle; tracking a position and orientation of the HMD in a specified coordinate system, to yield a line of sight (LOS) of the user wearing the HMD; obtaining a database containing obstacles data indicating at least one physical object located within the vehicle and affecting the FOV of the user; calculating an obstructed portion in the FOV of the user, based on the LOS and the database; generating from the vehicle image, an un-obstructed view which includes a portion of the scene overlapping the obstructed portion; and displaying in the HMD the un-obstructed view.

13 Claims, 13 Drawing Sheets

(51) Int. Cl.
*G06T 7/11* (2017.01)
*G06T 7/73* (2017.01)

(56) References Cited

U.S. PATENT DOCUMENTS

| | | | |
|---|---|---|---|
| 7,401,920 B1* | 7/2008 | Kranz | G02B 27/0093 |
| | | | 382/117 |
| 10,059,347 B2* | 8/2018 | Thieberger-Navon | |
| | | | B60W 50/14 |
| 10,371,944 B2* | 8/2019 | Mallinson | G02B 27/0172 |
| 10,874,164 B1* | 12/2020 | Jarrett | G02B 27/0176 |
| 2004/0169663 A1 | 9/2004 | Bernier | |
| 2005/0007261 A1 | 1/2005 | Berson et al. | |
| 2006/0181483 A1* | 8/2006 | Ari | F41G 7/2253 |
| | | | 359/630 |
| 2009/0231431 A1 | 9/2009 | Grigsby et al. | |
| 2012/0050140 A1* | 3/2012 | Border | G06F 3/011 |
| | | | 345/8 |
| 2012/0050143 A1* | 3/2012 | Border | G02B 27/0172 |
| | | | 345/8 |
| 2012/0154557 A1* | 6/2012 | Perez | G06F 3/017 |
| | | | 348/E13.001 |
| 2012/0215436 A1 | 8/2012 | Flotte et al. | |
| 2013/0073775 A1 | 3/2013 | Wade et al. | |
| 2013/0336629 A1* | 12/2013 | Mulholland | H04N 9/87 |
| | | | 386/230 |
| 2014/0111864 A1* | 4/2014 | Margulis | G02B 27/0172 |
| | | | 359/630 |
| 2015/0168730 A1* | 6/2015 | Ashkenazi | G02B 27/0176 |
| | | | 359/630 |
| 2015/0309311 A1* | 10/2015 | Cho | G02B 27/017 |
| | | | 345/8 |
| 2016/0025978 A1* | 1/2016 | Mallinson | G02B 27/0172 |
| | | | 345/8 |
| 2016/0266256 A1 | 9/2016 | Allen et al. | |
| 2017/0314924 A1 | 11/2017 | Royster et al. | |
| 2017/0318235 A1* | 11/2017 | Schneider | H04N 5/2628 |
| 2017/0330381 A1* | 11/2017 | Wright | G06F 3/017 |
| 2018/0088323 A1* | 3/2018 | Bao | G02B 27/017 |
| 2018/0096610 A1 | 4/2018 | Ray et al. | |
| 2018/0300954 A1 | 10/2018 | Fu et al. | |
| 2019/0129177 A1* | 5/2019 | Roimi | G02B 27/017 |
| 2019/0379878 A1* | 12/2019 | Chapman | H04N 13/117 |
| 2020/0085511 A1* | 3/2020 | Oezbek | A61B 90/39 |
| 2020/0211287 A1* | 7/2020 | Evans | H04N 13/332 |
| 2021/0048673 A1* | 2/2021 | Yan | G02F 1/294 |
| 2021/0048674 A1* | 2/2021 | Yan | G02B 27/283 |
| 2021/0168270 A1* | 6/2021 | Browne | G06F 3/011 |
| 2022/0092754 A1* | 3/2022 | Hakim | H04N 13/156 |
| 2022/0197377 A1* | 6/2022 | Kim | G06V 40/18 |
| 2022/0214546 A1* | 7/2022 | Marconcini | G02B 27/0093 |
| 2023/0384600 A1* | 11/2023 | Neimark | G06T 7/11 |

* cited by examiner

| DATABASE 77 OPTION A | | | |
|---|---|---|---|
| Objects ID | Coordinates | Objects dimensions | Objects importance |
| 60A | Xa,Ya,Za | X=50cm , Y=5cm, Z=20cm | 3 |
| 60B | Xb,Yb,Zb | X=6cm , Y=15cm, Z=10cm | 1 |
| 60C | Xc,Yb,Zb | X=6cm , Y=15cm, Z=10cm | 7 |
| 60n | Xn,Yn,Zn | | |

| DATABASE 77 OPTION B | | |
|---|---|---|
| Objects ID | Coordinates of the object outer contour | Objects importance |
| 60A | X1a,Y1a,Z1a ; X2a.Y2a,Z2a ; X3a,Y3a,Z3a..... | 3 |
| 60B | X1b,Y1b,Z1b ; X2b.Y2b,Z2b ; X3b,Y3b,Z3b..... | 1 |
| 60C | X1c,Y1c,Z1c ; X2c.Y2c,Z2c ; X3c,Y3c,Z3c.... | 7 |
| 60n | X1n,Y1n,Z1n ; X2n.Y2n,Z2n ; X3n,Y3n,Z3n..... | |

SYSTEM AND METHOD FOR REMOVING OBSTRUCTING OBJECTS IN A HEAD MOUNTED DISPLAY

CROSS REFERENCE TO RELATED APPLICATIONS

This Application is a continuation of PCT Application No. PCT/IL2022/050168 filed on Feb. 10, 2022, which claims the priority of Israeli Patent Application No. 280838 filed on Feb. 11, 2021, both of which are incorporated herein by reference in their entirety.

FIELD OF THE INVENTION

The present invention relates generally to the field of head mounted display (HMD) system worn by a user operating a vehicle having objects within the field of view causing obstructions in the field of view of the user viewing a scenery.

BACKGROUND OF THE INVENTION

Prior to the background of the invention being set forth, it may be helpful to provide definitions of certain terms that will be used hereinafter.

The term HMD as used herein refers to head mounted display system using any type of display and allows to project image data to the user, the HMD may be a see-through display or a non-see through display.

The term see through display as used herein is defined as a display which allows to see the scene directly by the user and simultaneously may provide augmented information overlaid on the outside scene.

The term non-see through display as used herein is defined as a display which is opaque and may provide data such as images or video of the outside scene using a sensor viewing the outside scene (additional data may be overlaid on the sensor data).

The term vehicle as used herein may comprise any vehicle having a volume used to accommodate a user operating the vehicle, the vehicle may have native systems and other objects located within the vehicle which some of them may be needed to operate the vehicle and others are just part of the vehicle structure.

One of the challenges of operating a vehicle is dealing with the ability to view the outside scene and maintaining a good situation awareness while operating different systems of the vehicle. While viewing the outside scene the user LOS (line of sight) is changing constantly and in some cases the user field of view may be obstructed by objects intersecting his LOS. This obstruction may cause the user to miss an important information within the scenery or may confuse the user which may lead to disorientation or reduced in situational awareness.

FIG. 1 shows a prior art system where a user is operating an aerial vehicle viewing scene 100, the user is wearing a HMD 22 which may provide information on the outside scene, the user field of view (FOV) 10 is tracked by tracking the line of sight (LOS) 11 of the user. In many cases when viewing scene 100 the user FOV 10 may be obstructed by canopy frame 14 and may appear as an obstruction 144 which may obstruct scene 100. This obstruction 144 may cause the user to miss an important information within scenery 100 or to reduce the user situational awareness due to lack of information of the outside surrounding. As will be explained below one of the objects of this invention is to remove obstructions such as obstruction 144 (and other obstructions derived from different type of objects) and to provide the user with a clear view of the scene.

BRIEF SUMMARY OF THE INVENTION

Some embodiments of the present invention suggest removing the obstruction from the FOV of the user by employing LOS tracking, mapping of objects within the vehicle and providing additional sensor capabilities from different points of view such that the overall outside scene will be clear to the user in ant desired user LOS.

These additional, and/or other aspects and/or advantages of the present invention are set forth in the detailed description which follows.

BRIEF DESCRIPTION OF THE DRAWINGS

For a better understanding of the invention and in order to show how it may be implemented, references are made, purely by way of example, to the accompanying drawings in which like numerals designate corresponding elements or sections. In the accompanying drawings.

Figure 1:
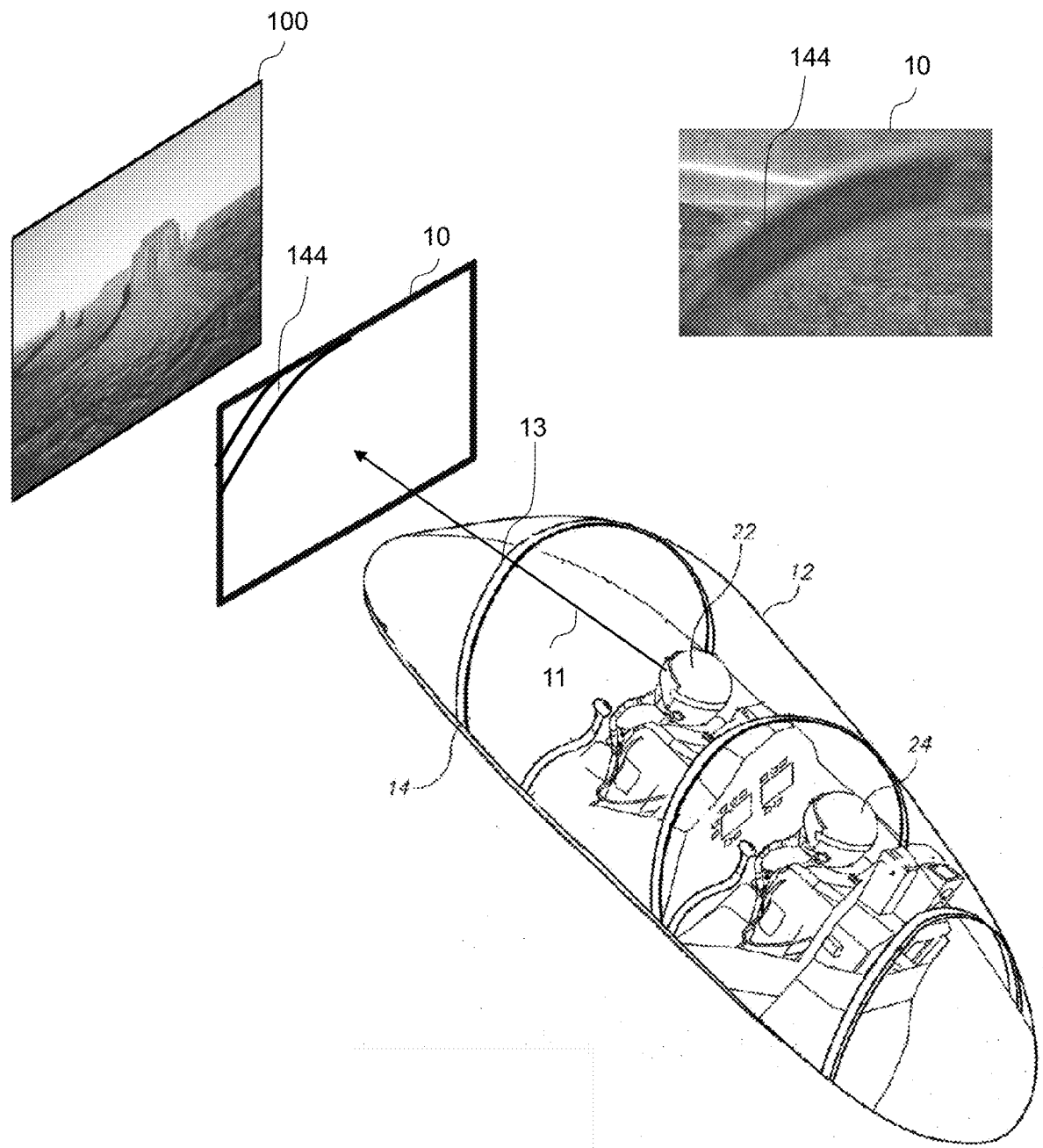
FIG. 1 shows an aerial vehicle operated by a user wearing a HMD having an obstructed FOV, in accordance with the prior art.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

With specific reference now to the drawings in detail, it is stressed that the particulars shown are for the purpose of example and solely for discussing the preferred embodiments of the present invention and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings makes apparent to those skilled in the art how the several forms of the invention may be embodied in practice.

Before explaining the embodiments of the invention in detail, it is to be understood that the invention is not limited in its application to the details of construction and the arrangement of the components set forth in the following descriptions or illustrated in the drawings. The invention is applicable to other embodiments and may be practiced or carried out in various ways. Also, it is to be understood that the phraseology and terminology employed herein is for the purpose of description and should not be regarded as limiting.

Figures 2A, 2B:
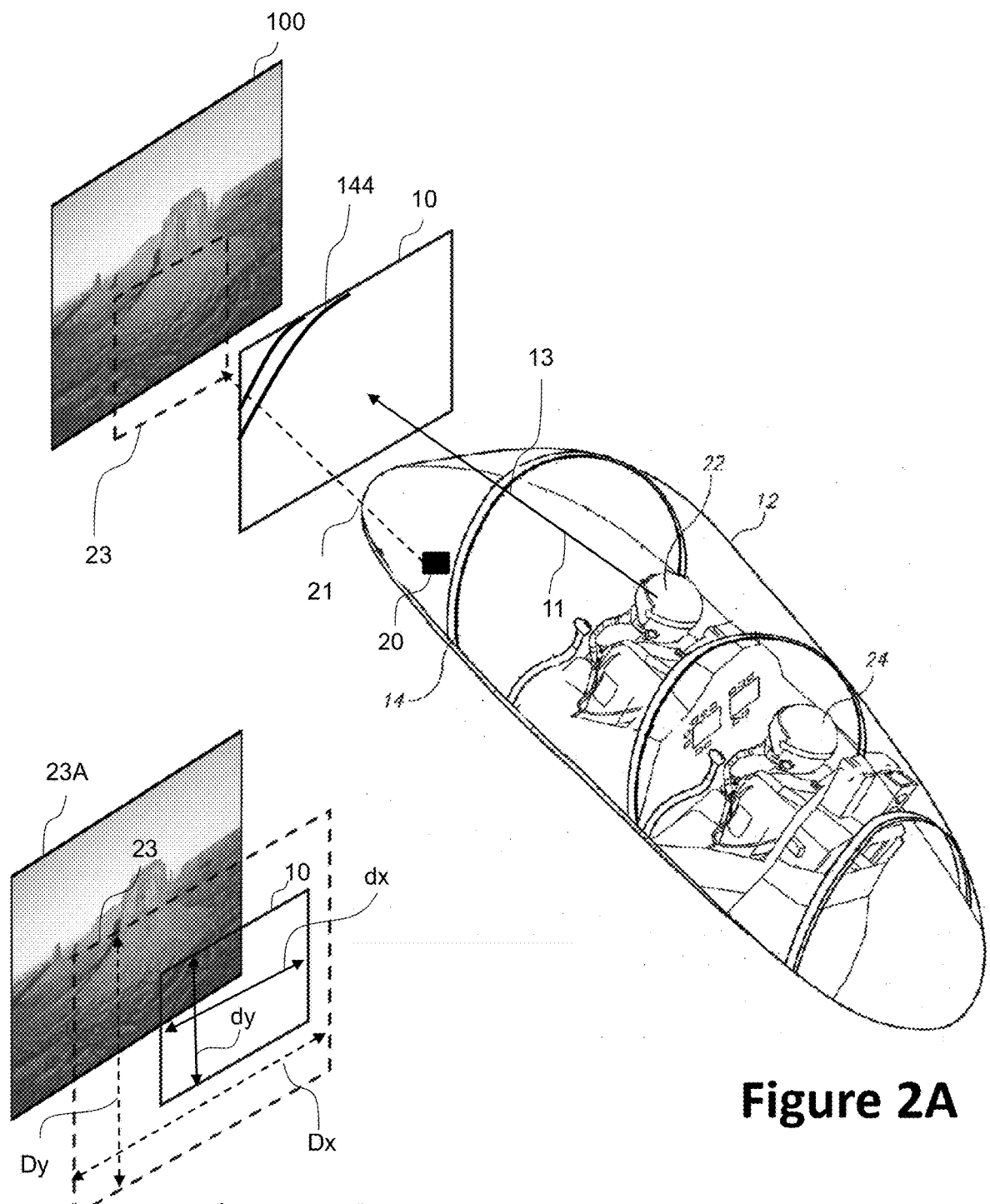
FIG. 2A-2B shows an aerial vehicle operated by a user wearing a HMD with a see through display and additional sensor mounted on the vehicle in accordance with one aspect of the invention.

FIG. 2A is a diagram of an aerial vehicle illustrating an exemplary non-limiting implementation according to some embodiments of the present invention. In this figure a user operating the vehicle may wear a HMD 22 and may turn his head to view the outside scene 100 in any desired direction such as line of sight (LOS) 11. A tracker coupled to the vehicle or to the HMD (not shown) may track HMD 22 to yield LOS 11 and a user field of view (FOV) 10. When the user LOS 11 intersects an object such as canopy frame 14 which may obstruct FOV 10 the processor (not shown) may calculate the obstruction parameters such as size and shape within the user FOV 10 and can remove obstruction 144 by extracting an un-obstructed ROI or stream of pixels from sensor 20 mounted on the vehicle and positioned in a different location from HMD 22, viewing the same outside scene 100 with LOS 21 and FOV 23 which is not effected by obstructing object 14. HMD 22 may display the extracted ROI or stream of pixels to the user as an overlay merged with the outside scene positioned over obstruction area 144 and by that may provide an un-obstructed view of scene 100 to the user.

According to various embodiments, tracker (not shown) may yield any type of tracking technology such as: optical, magnetic, and inertial or hybrid tracking technology. The tracker may yield the HMD 22 LOS 11 in any coordinate system such as vehicle coordinate system, earth coordinate system or HMD coordinate system. The tracker may have a sensor capable of detecting markers within the vehicle marking locations of objects obstructing predefined specific LOS's.

According to yet another embodiments, the processor (not shown) may calculate the obstruction in real time or may predict a near future obstruction by combining a predefined mapping data of objects within the vehicle (such as object 14 canopy frame) and user LOS 11. Using the object data which includes at least the objects position within the vehicle and the user LOS, the processor may calculate when a user LOS is intersecting or is predicted to intersect a mapped object such as an intersection point 13. The processor may prepare in real time or in advance the un-obstructed stream of pixels or may crop a ROI extracted from sensor 20 having a FOV 23, and further configured to transmit the ROI or pixels to HMD 22 to be displayed as an overlay on outside scene 100.

According to another embodiments, sensor 20 may be a single sensor or may be part of plurality of sensor coupled to the vehicle in different positions and may generate a vehicle image (an image or video generated from a sensor mounted on the vehicle) or vehicle video of the scene from the sensor point of view. Sensor 20 may capture scene 100 in the visible spectrum to yield pixels or ROI that can be merged or overlaid (conformal) on the user head mounted display (HMD 22) while the user is viewing scene 100 directly through a see through display. Sensor 20 capturing FOV 23 may be in overlap with user FOV 10 but due to the fact that sensor 20 position is not effected by object 14 when viewing scene 100 an un-obstructed view of the scene may be generated from the vehicle image and may be overlaid on the user HMD. Sensor 20 may be gimbaled allowing the sensor to change its LOS 21 to any direction the user or the system required, in another embodiment LOS 21 may be salved to the user LOS 11 tracked by the tracker configured to tracked the position and orientation of user HMD 22 such that it may provide a wide dynamic coverage in any direction the user moves his head. In yet another embodiment sensor 20 may be rigidly fixed to the vehicle without the capability to change its LOS.

FIG. 2B illustrates yet another embodiment where sensor 20 may have a wide FOV 23 which may be wider than user FOV 10 and by that may provide scene coverage to a plurality of user FOV 10 within sensor 20 having FOV 23. Dy and Dx of FOV 23 can accommodate multiple dy and dx of user FOV 10 therefore as long as user FOV 10 is within sensor FOV 23 area the processor may extract the obstructed area from sensor image 23A.

Figure 3A:
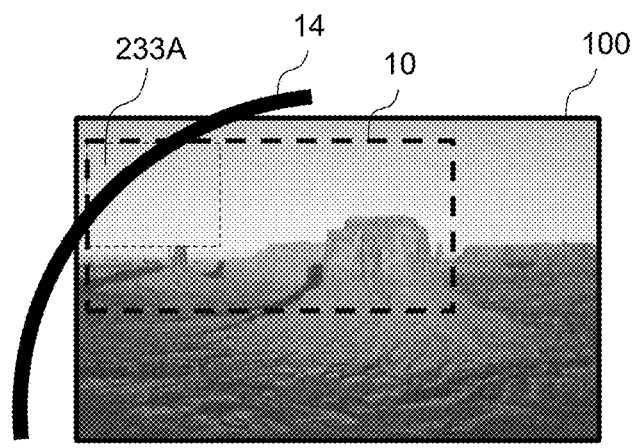
FIGS. 3A-3D show the image displayed to the user after performing removal of obstructing object, in accordance with some embodiments of the invention.
Figure 3B:
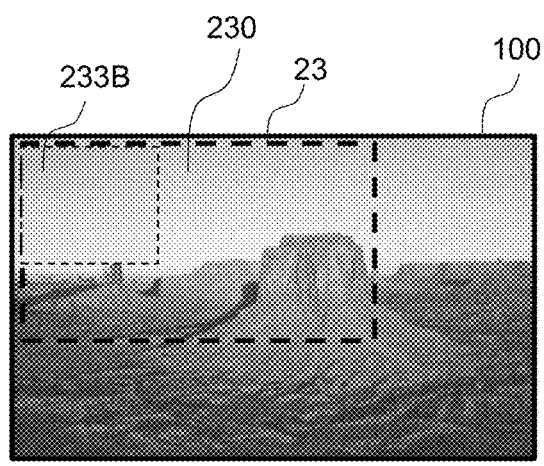
Figure 3C:
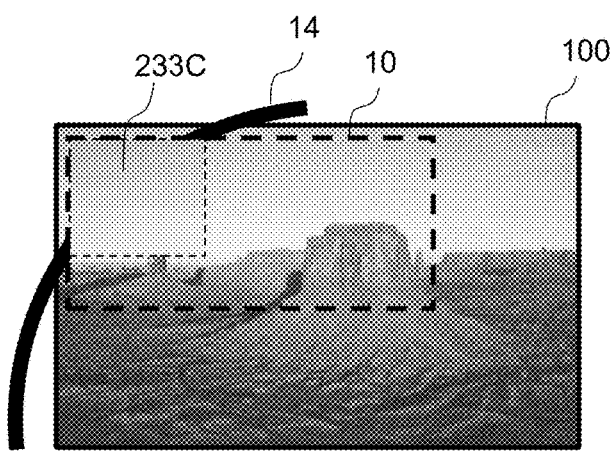
Figure 3D:
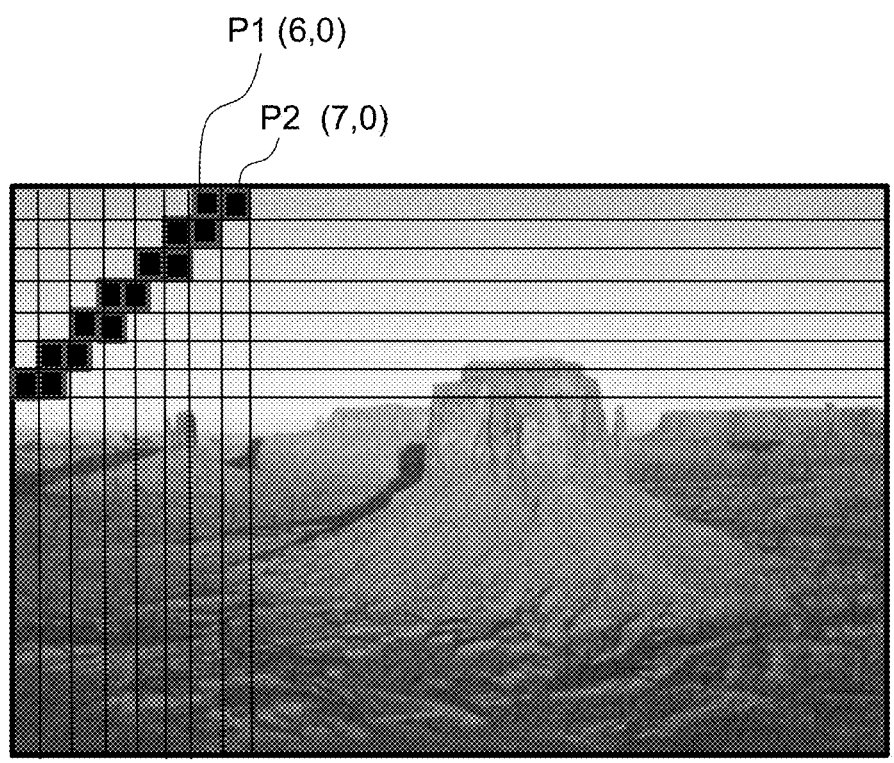

FIGS. 3A-3C are illustrating an exemplary non-limiting display implementation according to some embodiments of the present invention. FIG. 3A shows one of the problems created when object 14 (canopy frame) may cause an obstruction in user FOV 10 obstructing scene 100. FIG. 3B illustrates sensor 20 which may have FOV 23 and may capture from the sensor mounting position on the vehicle a vehicle image 230, the vehicle image 230 is not obstructed by object 14 due to the sensor position relative to scenery 100 and object 14. The processor may calculate the obstruction area 233A which may be cropped from vehicle image 230 generating un-obstructed ROI 233B and transfer the ROI to the HMD to be displayed as an overlay 233C on scene 100 that may allow to remove obstructing object 14 as shown in FIG. 3C. Yet in another embodiment the processor may calculate only the pixels within FIG. 3A that are obstructed within scene 100 and may further replace only the obstructed pixels by pushing stream of pixels extracted from vehicle image 230. Using as input a known user LOS and a known sensor 20 properties (FOV, resolution, depth of field etc.) combined with object data properties (will be explained further below) the position of the obstructed pixels are known in advance and the processor may compensate and remove the obstruction either by cropping ROI as indicated in FIG. 3B-3C or may replace only the obstructed pixels according to FIG. 3D. As shown in FIG. 3D pixels P1 in position (6,0) and P2 in position (7,0) in the user FOV are obstructed (the rest of the obstructed pixels are not numbered but can be seen in the figure) the processor may calculate the position of the pixels without doing any image processing to distinguish the obstructed (black) pixels, the processor may only need to know obstructing object properties (location, size, shape . . . ) user display properties and user LOS, combining these inputs may provide the exact position of the obstructed pixel well in advance or in real time.

Figure 4A:
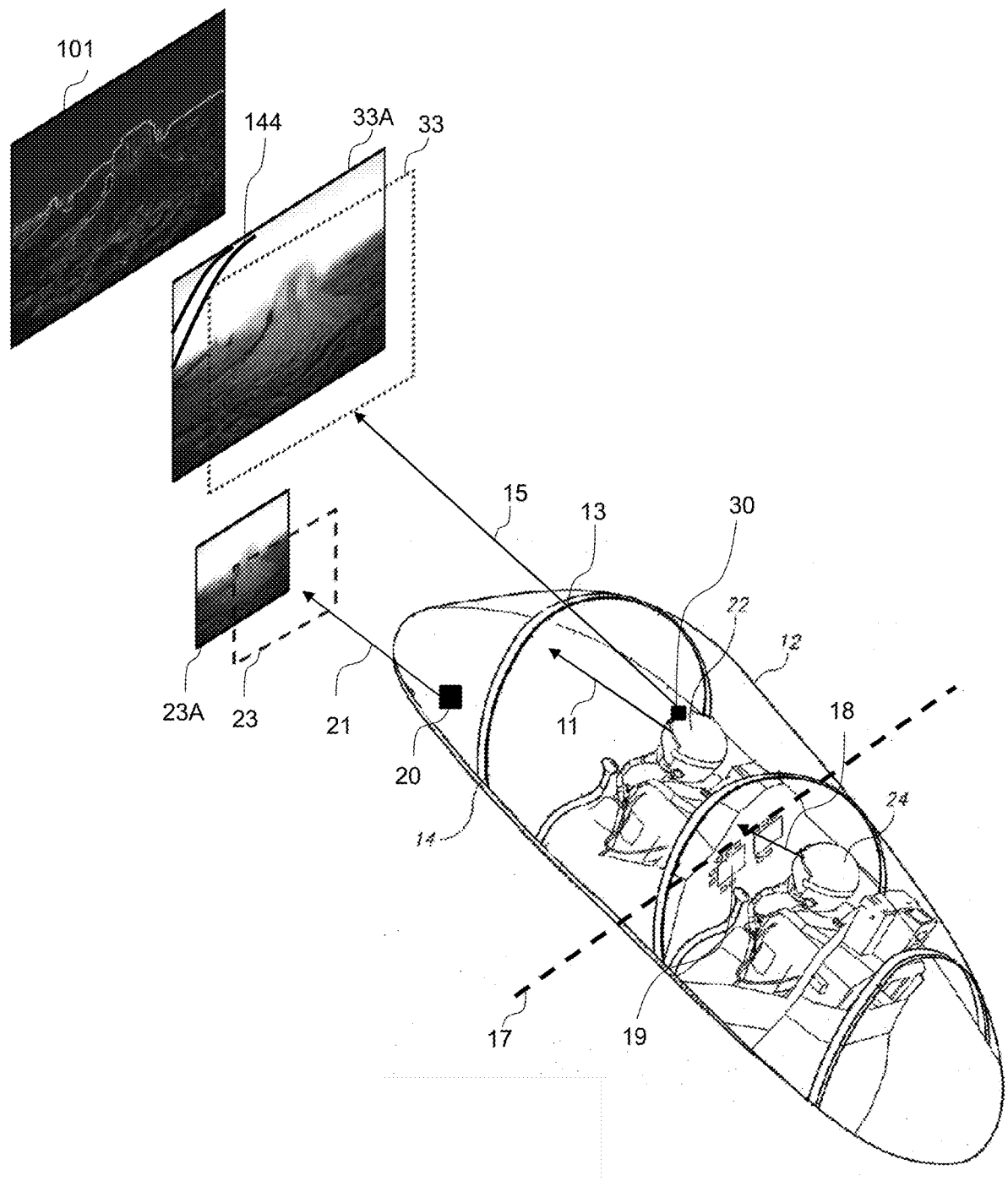
FIGS. 4A-4B show an aerial vehicle operated by a user wearing a HMD coupled with a sensor, in accordance with some embodiments of the present invention.

FIG. 4A is a diagram of an aerial vehicle illustrating an exemplary non-limiting implementation according to some embodiments of the present invention. As described in FIG. 2 a user operating the vehicle may wear a HMD 22 and may turn his head to view the outside scene 101 in any desired direction such as line of sight (LOS) 11. In this embodiment a second sensor 30 is mounted on HMD 22 and may capture scene 101 in accordance to sensor having LOS 15 and sensor 30 having FOV 33 to yield a LOS image 33A. Sensor 30 captured image or video 33A may be displayed on user HMD 22 as partial overlay on the user FOV or may cover the entire user FOV such that the user will be able to see outside scene 101 mostly or entirely via sensor 30 data stream. As second sensor 30 is mounted on user HMD 22 the sensor FOV 33 may be obstructed from the same or almost the same obstructing elements such as obstructing object 14. In this embodiment the processor may extract an un-obstructed ROI or un-obstructed pixels from the first sensor 20 with FOV 23 capturing vehicle image 23A and may further display them as an overlay on second sensor 30 LOS image 33A such that the obstruction is removed and the user may see the outside scene 101 without any obstructions.

According to some embodiments of the present invention, sensor 30 may be a night vision sensor capturing the scene and may enhance scene 101 during low visibility conditions. Sensor 30 may be a stereo sensor providing a stereoscopic image or video of the scene. Sensor can be mounted in the closest position available to the user eyes and by that may reduce the parallax between the sensor and the user perspective to minimum. Sensor 20 may be gimbaled allowing the sensor to change its LOS 21 to any direction or to be salved to sensor 30 LOS such that it may follow sensor 30 LOS 15 and provide a wide dynamic coverage in any direction the user directs his head. Sensor 20 and sensor 30 may be of the same sensor or may be of different type of sensors capable of detecting different spectrums of light emitted from the outside scene.

In yet another embodiment of the invention a second user wearing HMD 24 having LOS 18 may request to see an un-obstructed view of the scene. The second user may see in his HMD (24) the scene as perceived by sensor 30 mounted on the first user and enhanced by sensor 20 to remove any obstructions. Second user may provide a spatial threshold (TH) such as vertical threshold 17 such that when user LOS 18 is directed below vertical threshold 17 the second user HMD 24 (directly as see through display or full VR in other cases) may display information derived from the real vehicle native systems such as native system 19, and on the other hand when user LOS 18 is directed above vertical threshold 17 the user may see in his HMD 24 the outside scene without any obstructions. The Second user may the request to display as the first user view in a first mode providing scene data according the first user LOS 11 or may switch to a second mode where sensor 20, 30 or other sensors may provide scene data according to his LOS 18.

Figure 4B:
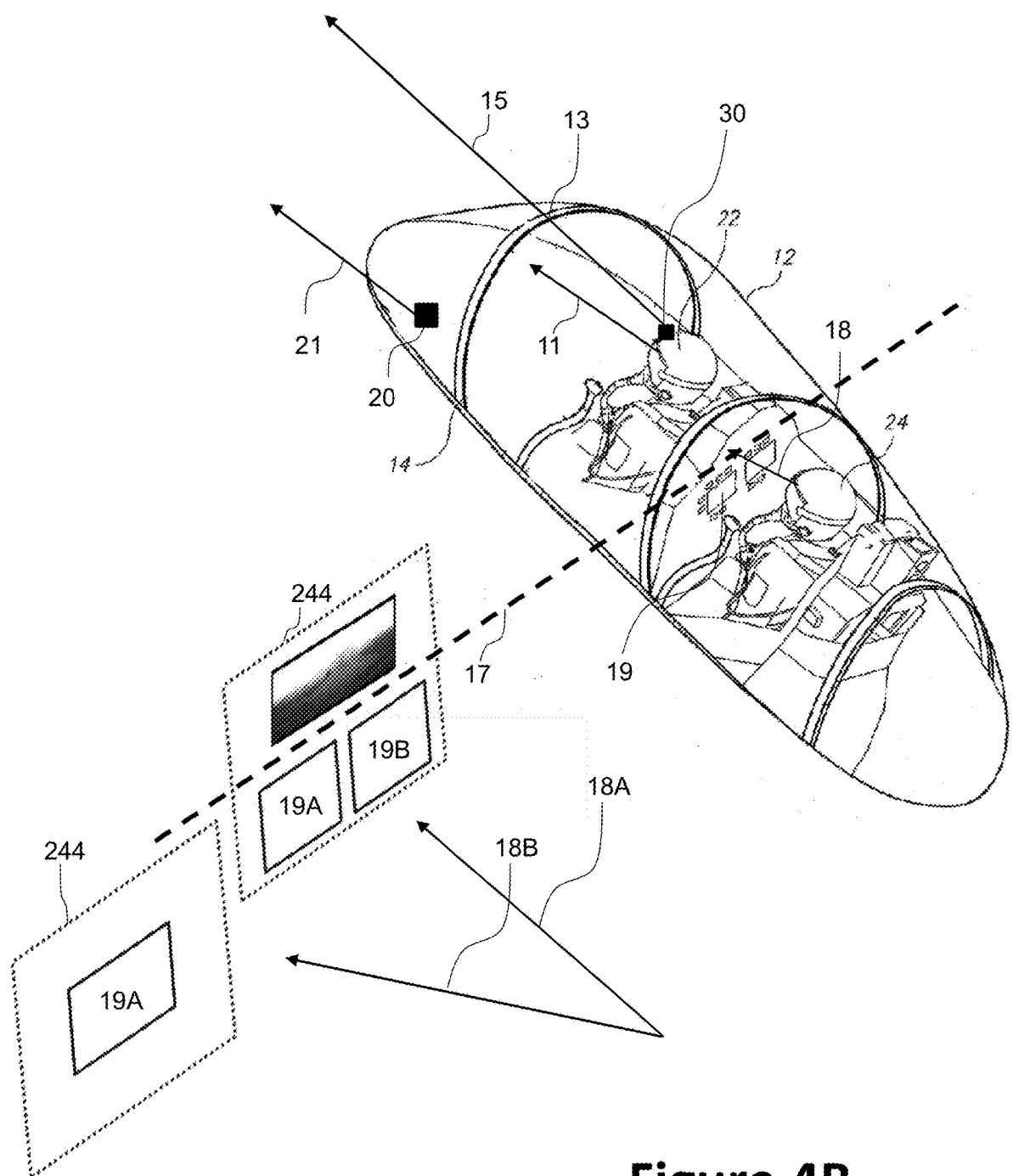

According to some embodiments of the present invention as illustrated in FIG. 4B the second user may request to switch to different modes of displays in his HMD (24), in a first mode second user LOS 18A having a FOV 244 is a partially above vertical threshold 17 in this case the second user may see in his HMD a dynamic display presenting in first area of the display the outside scene image as perceived by the first user without any obstructions (as mentioned in FIGS. 3 and 4) extracted from sensor 20 and overlaid on sensor 30, and in the other area of the display below vertical threshold 17 the native systems information 19A, 19B. The Native data 19A, 19B may be displayed directly through the user HMD having a see-through HMD (see through visor) such that below vertical TH 17 the user will see the vehicle directly and above TH 17 the user will see image or video extracted from sensors 20 and 30 according to the invention as described above. In another embodiment the native systems 19A, 19B may be displayed as virtual screens representing any native system according to the user demand, the information on the virtual screen may be replaced to show any native system in the vehicle. The virtual screens may be locked in spatial location according to predefined location or according to user demand. The user may lock virtual screen 19A using his LOS designation and additional command or press of a button. When user LOS 18B is directed lower such that user FOV 244 is below TH 17 the display is changing to show only the native vehicle data 19A (in any of the method described above). The embodiment described here may be operative by the first user or the second user, the TH 17 may be vertical, horizontal or in any shape, TH 17 may be predefined or created on demand in real time by the users using his LOS designation or other input devices in the vehicle. In any of the embodiments above the HMD (22,24) may display the outside scene such that the vehicle sensor 20 is providing outside scene data from a position (point of view) not effected by obstructing elements within the vehicle such as obstructing element 14.

Figure 5:
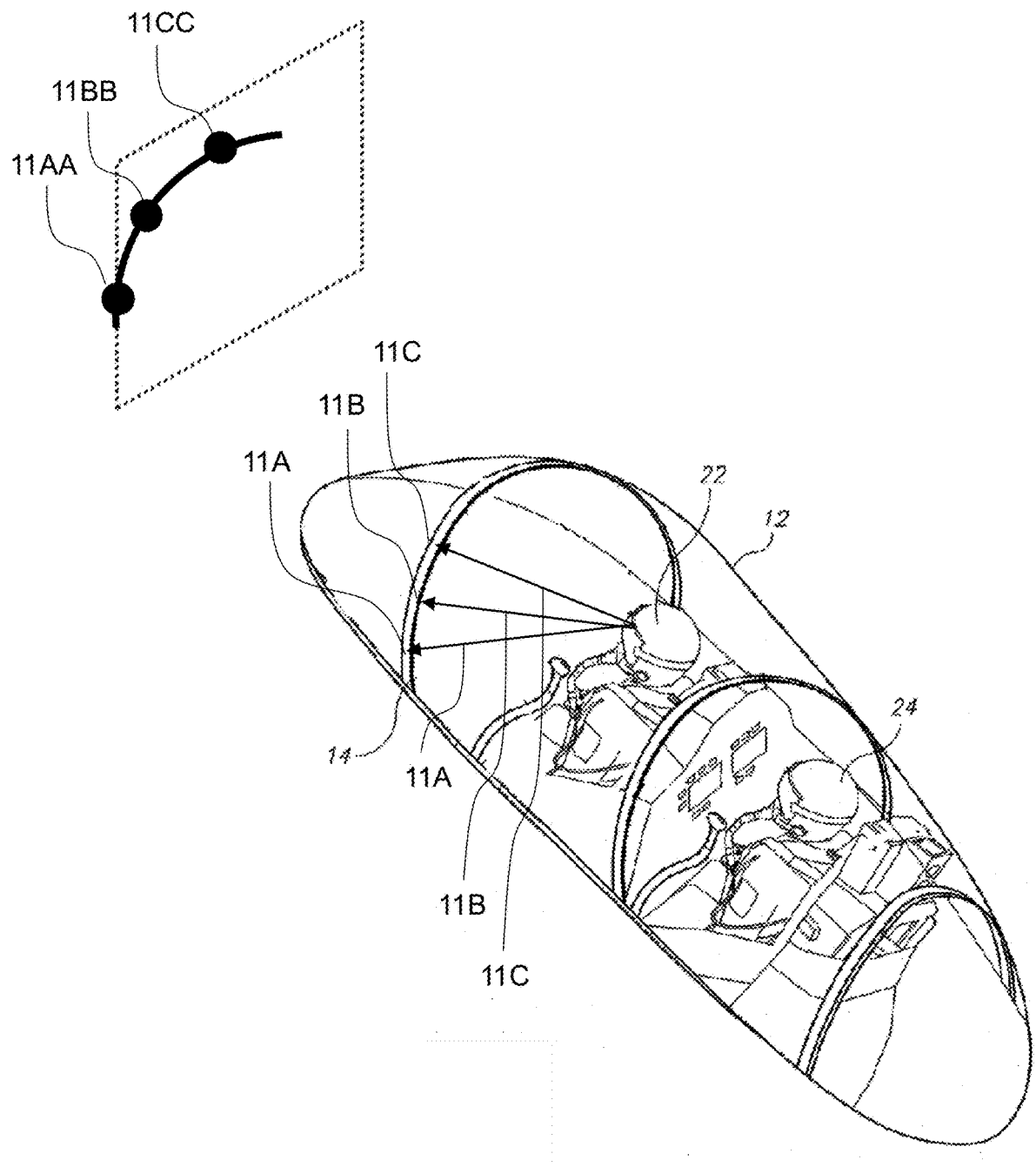
FIG. 5 shows a vehicle operated by a user wearing a HMD designating obstructions, in accordance with some embodiments of the present invention.
Figure 6:
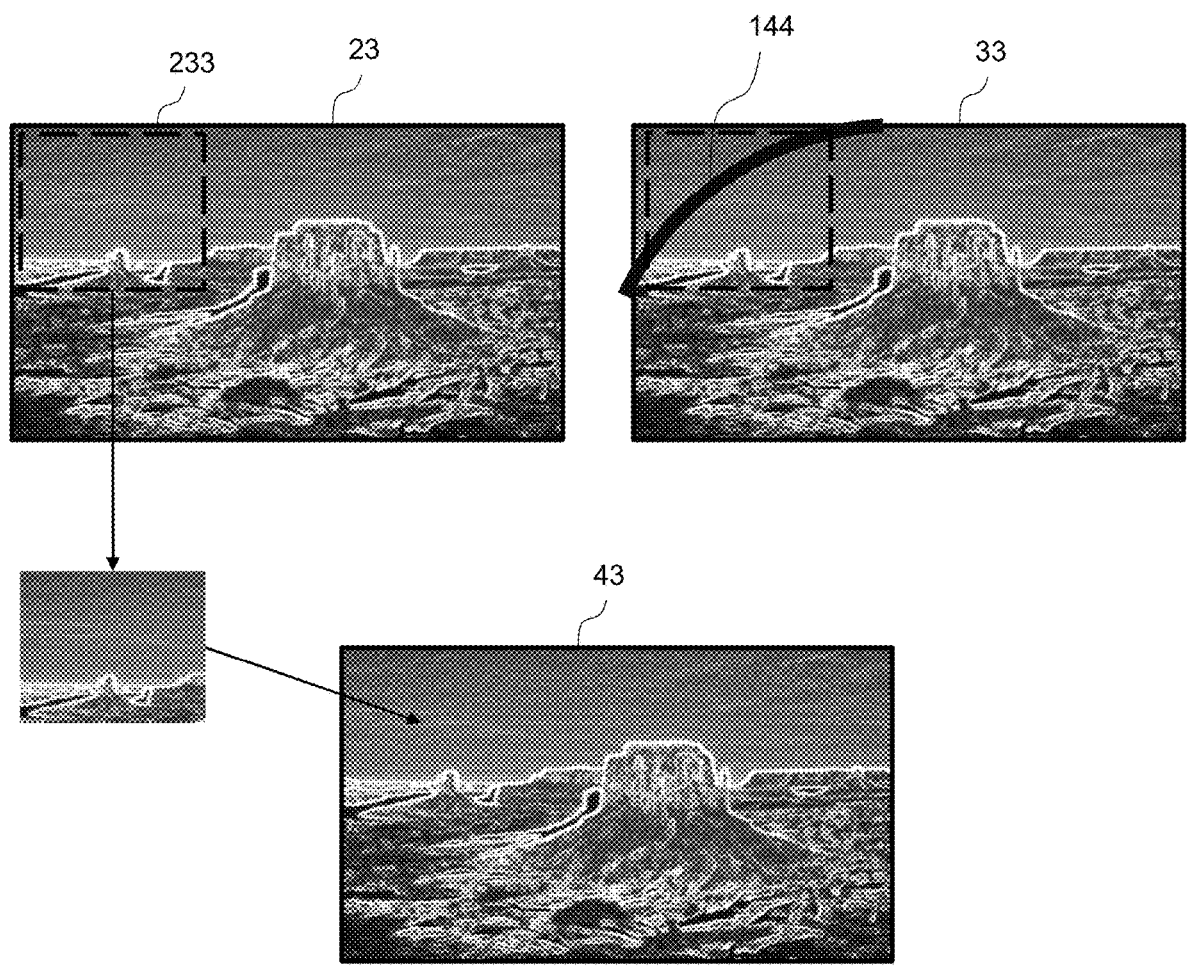
FIG. 6 shows the image displayed to the user after performing LOS designation indicating obstructing object, in accordance with some embodiments of the invention.

FIG. 5 is a diagram an aerial vehicle displaying an unobstructed view of the outside scene via HMD 22 in accordance with some embodiments of the present invention. In this embodiment the user using his LOS 11A,11B, 11C may generate an obstruction element this LOS designation mapping may be added to the predefined obstructing objects within the database, it may replace objects or update existing objects within the database. The user may designate using his LOS 11 points within the vehicle and by interpolating the points the processor may generate an object data location and size, the level of importance of this object may be added by the user. The designation mapping may be enhanced using the HMD tracker for continuous tracking the designation point of the user LOS, the triggering event for starting of the mapping process and ending it may be activated using any user command. FIG. 6 is yet another example where sensor 20 and sensor 30 are night vision sensors, LOS image 33 generated from HMD mounted sensor 30 and suffers from blockage in the image such as obstructing element 144, the processor extracts from vehicle image 23 un-obstructed pixels or un-obstructed ROI 233 to be presented as overlay on LOS image 33 generating an unobstructed scene image 43. The obstruction area or pixels as described above are calculated by the processor using as inputs the user LOS and the known obstructing objects stored in the database, when user LOS is intersecting or predicted to intersect an obstructing object the processor may calculate in advance or in real time the exact location within the user FOV that will suffer from obstruction, the processor may continuously extract pixels or ROI from sensor 20 to keep the user scene display unobstructed such as image 43.

Figures 7A, 7B:
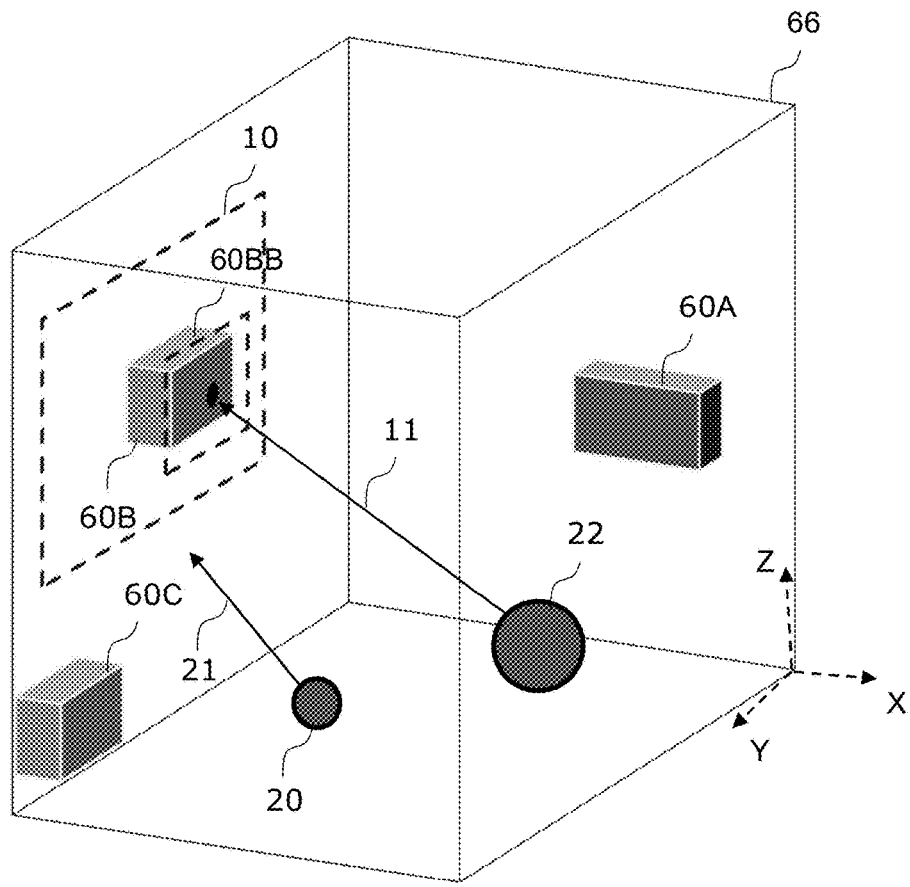
FIGS. 7A and 7B describing a vehicle object mapping and a look up table to address the objects parameters, in accordance with some embodiments of the present invention.

FIGS. 7A and 7B illustrating vehicle mapping and database of obstructing objects within a vehicle according to some embodiments of the invention. In FIG. 7A are presented plurality of obstructing objects 60A, 60B, and 60C within vehicle 66. The user HMD 22 having LOS 11 and sensor 20 having LOS 21 are located within the same vehicle 66. The obstructing objects 60A-60C may be mapped in advance using a known 3D mapping of the vehicle. The obstructing objects 60A-60C may be mapped in real time using depth sensor mounted on the user HMD 22 to generate 3D map of the vehicle using a natural movements of the user during operation of the vehicle. The user natural moments may update an existing 3D database or may generate a new database. When the user turns his head the system tracker continuously tracks the user LOS such as LOS 11, when the processor calculates an obstruction within user FOV 10 the processor extracts unobstructed pixels or ROI from sensor 20 mounted on the vehicle. The processor calculates the obstruction using an existing database such as the database in FIG. 7B and the user LSO 11 tracked by the system tracker. Database 77 may comprise: objects ID (index), objects position X, Y, Z, objects dimensions, objects importance. The processor may use the user LOS 11 intersecting or predicted to intersect an object in known location such as object 60B having position Xb, Yb, Zb and to calculate the obstruction area. To improve the processor calculation of the obstruction area additional layers of information may be presented in the database, the obstructing objects dimension may support the processor in calculating the exact area that will be obstructed, in this example obstructing object 60B having dimensions of X=6 cm, Y=15 cm, Z=10 cm will generate an obstructed area 60BB, this area will be replaced by pixels or ROI extracted from vehicle image generated from sensor 20 to yield an un obstructed image of the scene to the user. In some embodiments a predefined obstructing area will be generated as default without using the exact dimensions of the obstructing objects (using a default dimensions around the user LOS i.e. an area of X=20 cm, Y=20 cm, Z=20 cm). Database 77 may provide the importance of the obstruction objects to be removed, when object importance (importance=1) is high such as importance of object 60B the processor may provide more resources to remove the obstruction generated by objects having a higher importance grade than objects having a lower importance grade such as object (importance=7) located in a corner position and with limited obstruction in the main FOV of the user. In some cases the system or the user may indicate some objects that are not to be replaced in any case due to the importance of those objects to the user (not to be replaced with sensor 20 data such that the user will always see them even if they obstruct his FOV)

Figure 8A:
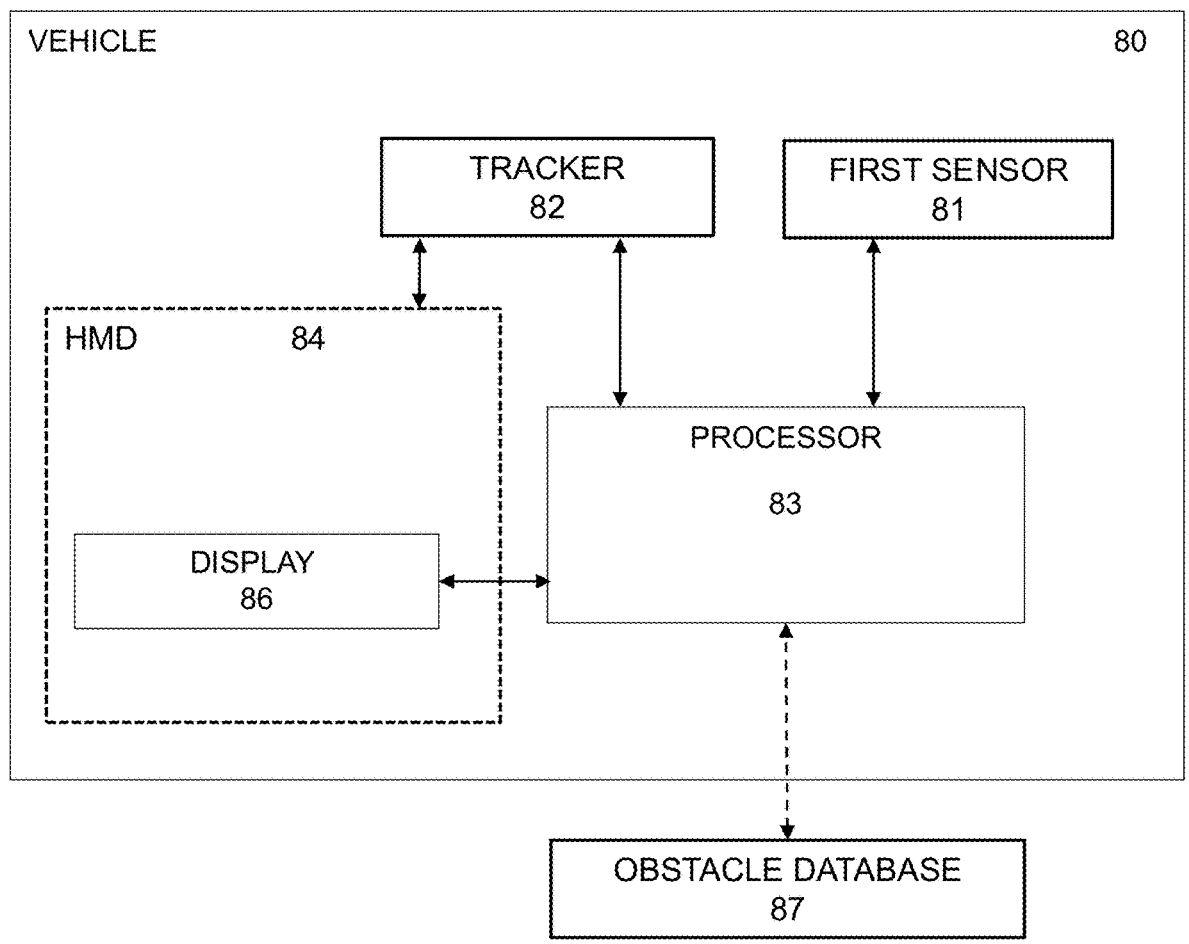
FIG. 8A is a schematic illustration of HMD system, according to a first embodiment.

FIG. 8A is a block diagram of an HMD system mounted on a vehicle, in accordance with some embodiments of the present invention. HMD 84 worn by a user operating a vehicle 80. In this embodiment a first sensor 81 may be mounted on vehicle 80 for capturing a vehicle image of the outside scene, the sensor may provide a vehicle image or vehicle video to processor 83 for further use. A tracker 82 may provide a continuous tracking of HMD 84 position and orientation in a defined coordinate system such as vehicle coordinate system, HMD coordinate system or earth coordinate system to yield a LOS of a user wearing the HMD. An obstacle database 87 may provide at least one object data located within vehicle 80, the object data may comprise object position within the vehicle. Object data may further comprise other information relating to the obstacles such as objects size, importance, texture, reflectivity and other properties that may indicate the way the object may be presented in the HMD. Processor 83 may receive the user LOS and at least one object data and further may calculate an obstruction in the LOS of the user viewing the scene. The processor may further extract un-obstructed pixels or ROI from first sensor 81 capturing vehicle image and may further generate an un-obstructed view of the scene. Display 86 may display the un-obstructed scene view generated by processor 83 comprising both first sensor data fused on the outside scene view (pixels overlay, pixels replaced or cropped ROI driven). The first sensor may be night vision sensor capable of enhancing scene view in low visibility conditions. Tracker 82 may be of any type technology for tracking the HMD such as but not limited to: inertial tracking, magnetic tracking, optical tracking or any combination and hybridization of the tracking capabilities. Display 86 may be see-through display allowing to directly view the scene while providing an overlay data driven from processor 83 and project the display. Display 86 may be opaque and provide information of the outside scene by projecting the first sensor data in VR mode. Display 86 may be capable of switching from full see through mode to a full opaque mode using known photo-chromatic, electro-chromatic capabilities. Display 86 may switch from full see through mode to a full opaque mode in specific areas where the user is expected to see the outside scene or the native systems of the vehicle. In cases where the user wants to see the outside scene in full opaque mode while allowing to see the native vehicle systems only part of the display may be tinted/blocked to provide both capabilities. Processor 83 may be mounted on the vehicle or on the HMD. Obstacle database may be mounted on the vehicle, on the HMD or remotely located using cloud capabilities (remote server—not installed on the vehicle). Obstacle database 87 may be updated using user LOS designation mapping as indicated above. Vehicle 80 may be any type of vehicle aerial or land vehicle which comprises a user operating the vehicle from within the vehicle and may wear an HMD for purposes of viewing the outside scene.

Figure 8B:
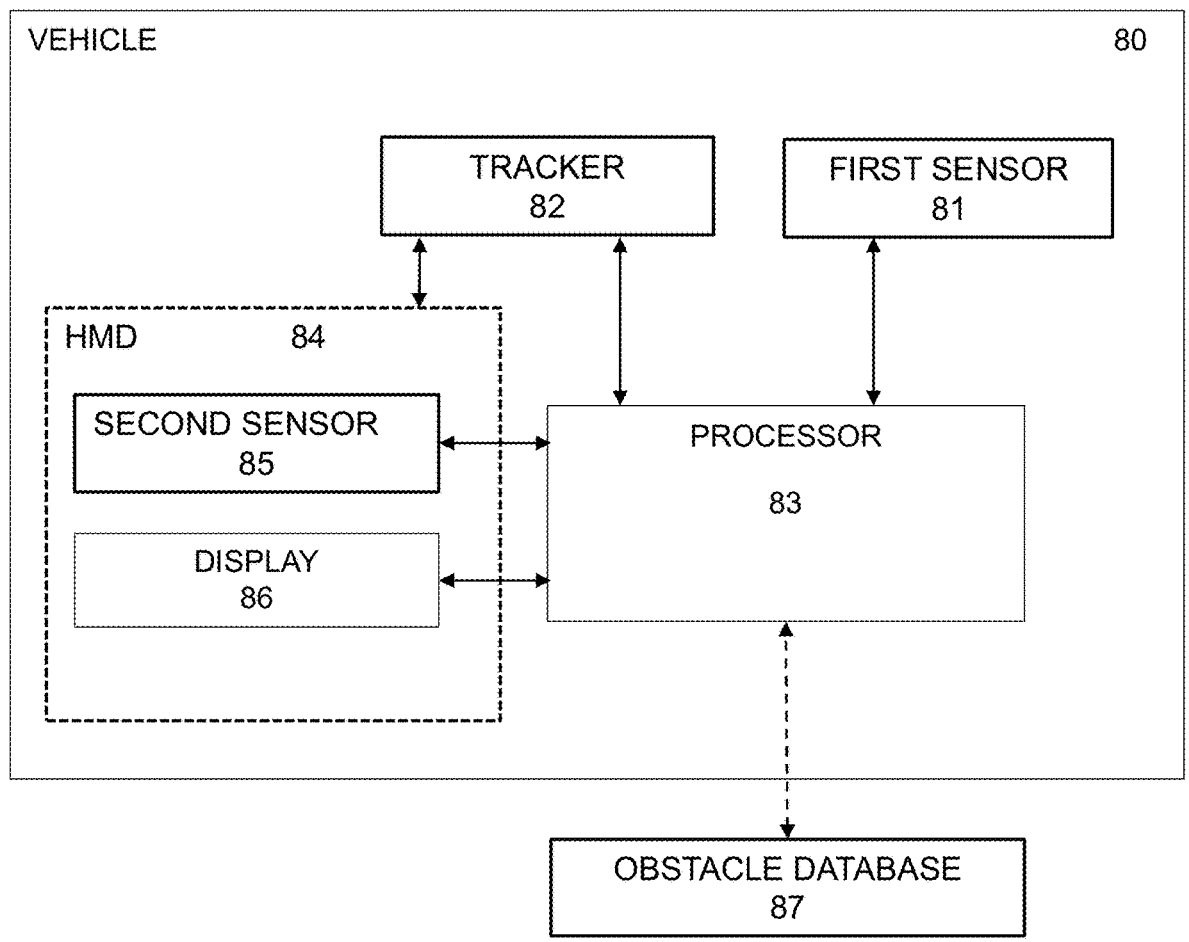
FIG. 8B is a schematic illustration of HMD system, according to a second embodiment.

FIG. 8B is a block diagram of an HMD system mounted on a vehicle, in accordance with some embodiments of the present invention. HMD 84 worn by a user operating a vehicle 80. In this embodiment a first sensor 81 may be mounted on vehicle 80 for capturing a vehicle image of the outside scene, the sensor may provide a vehicle image or vehicle video to processor 83 for further use. A tracker 82 may provide a continuous tracking of HMD 84 position and orientation in a defined coordinate system such as vehicle coordinate system, HMD coordinate system or earth coordinate system to yield a LOS of a user wearing the HMD. An obstacle database 87 may provide at least one object data located within vehicle 80, the object data may comprise object position within the vehicle. Object data may further comprise other information relating to the obstacles such as objects size, importance, texture, reflectivity and other properties that may indicate the way the object may be presented in the HMD. A second sensor may be mounted on HMD 84 and may capture a LOS image of the scene from said HMD position, the LOS image may be as closest as possible to the user perspective and by that reducing parallax between user eyes and the second sensor captured image. Processor 83 may receive the user LOS and at least one object data and further may calculate an obstruction in the LOS image provided by the second sensor. The sensor may further extract un-obstructed pixels or ROI from first sensor 81 and may further replace or overlay the obstructed pixel or area within LOS image. Display 86 may display the un-obstructed scene view generated by processor 83 and comprising both first and second sensors data fused (pixels overlay, pixels replaced or cropped ROI driven). Both sensors may be night vision sensors capable of enhancing scene view in low visibility conditions. Tracker 82 may be of any type technology for tracking the HMD such as but not limited to: inertial tracking, magnetic tracking, optical tracking or any combination and hybridization of the tracking capabilities. Display 86 may be see-through display allowing to directly view the scene while providing an overlay data driven from processor 83 and project the display. Display 86 may be opaque and provide information of the outside scene by projecting the sensors data in VR mode. Display 86 may be capable of switching from full see through mode to a full opaque mode using known photo-chromatic, electro-chromatic capabilities. Display 86 may switch from full see through mode to a full opaque mode in specific areas where the user is expected to see the outside scene or the native systems of the vehicle. In cases where the user wants to see the outside scene in full opaque mode while allowing to see the native vehicle systems only part of the display may be tinted/blocked to provide both capabilities. Processor 83 may be mounted on the vehicle or on the HMD. Obstacle database may be mounted on the vehicle, on the HMD or remotely located using cloud capabilities (remote server) not installed on the vehicle. The obstacle database 87 may be updated using the second sensor mounted on the HMD to provide scanning of the vehicle using a natural head movements of the user. Obstacle database 87 may be updated using user LOS designation mapping as indicated above. Vehicle 80 may be any type of vehicle aerial or land vehicle which comprises a user operating the vehicle from within the vehicle and may wear an HMD for purposes of viewing the outside scene.

Figure 9:
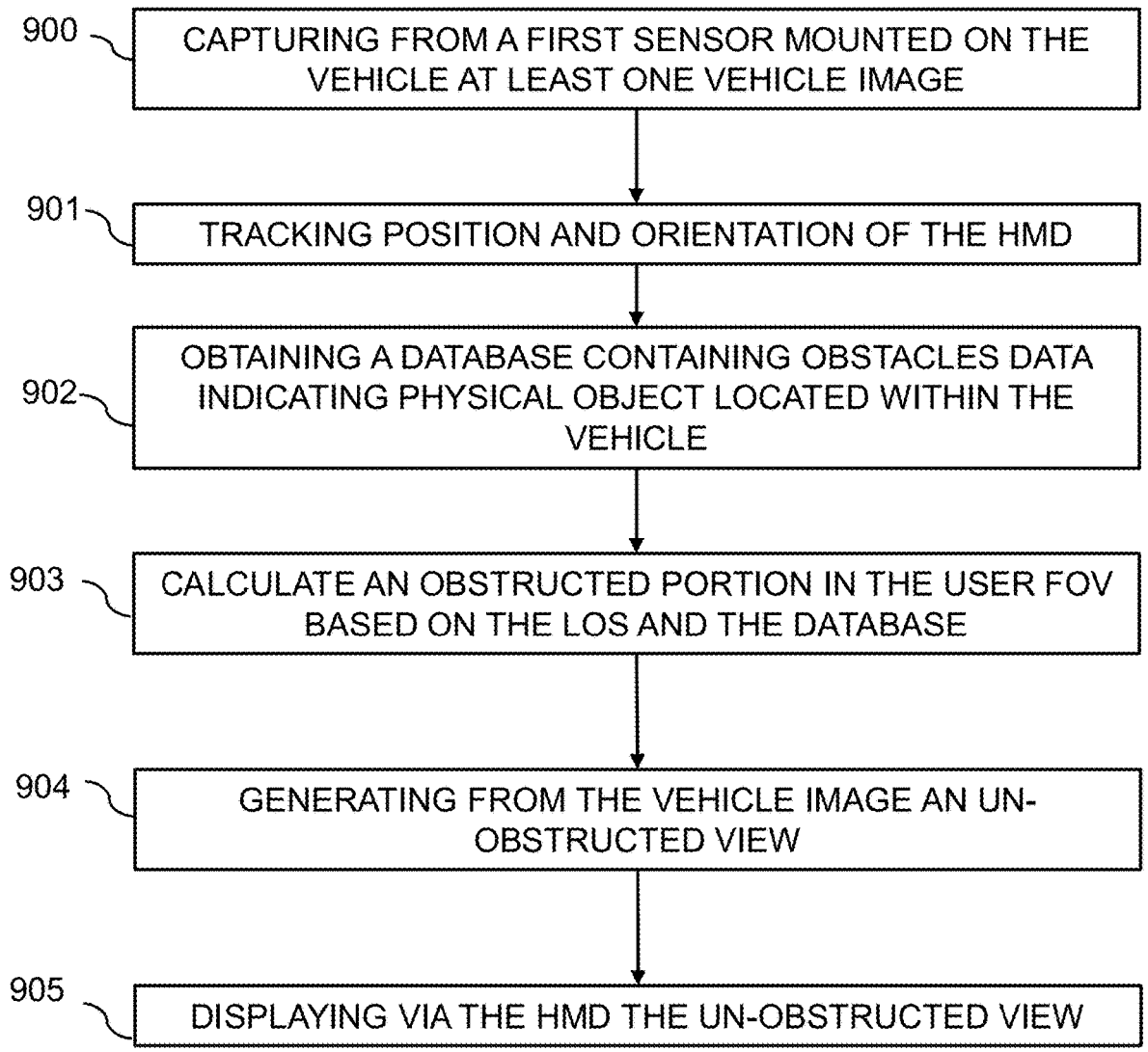
FIG. 9 is a flowchart of a method for generating and displaying to the user an unobstructed scene view, according to some embodiments.

FIG. 9 is a flowchart of a method for generating and displaying to the user wearing a HMD an un-obstructed view of the, according to a first embodiment. In this first embodiment a method for displaying a scene to a user wearing a head mounted display (HMD) while removing obstructions in a field of view (FOV) of the user viewing the scene and operating a vehicle is presented. Capturing in step 900 by a first sensor at least one vehicle image of the scene wherein the first sensor may be mounted on the vehicle, step 901 tracking position and orientation of HMD 22 in a specified coordinate system thereby allowing to yield a line of sight (LOS) of the user wearing the HMD. Obtaining in step 902 a database containing obstacles data indicating at least one physical object located within the vehicle and affecting the FOV of the user. Calculating in step 903 by a computing device, an obstructed portion in the FOV of the user viewing the scene based on the tracked LOS and the database. Generating in step 904 from the vehicle image an un-obstructed view which comprises a portion of the scene overlapping the obstructed portion, displaying via the HMD the un-obstructed view to the user. The user is wearing HMD 22 and viewing the outside scene directly through his visor where in some cases the scene in a specific LOS is obstructed by at least one physical object (such as canopy of the aircraft). The method may use a tracker to track the HMD position and orientation to yield the user line of sight (tracking the HMD or tracking the user head). The method may further receive at least one physical object data located within the vehicle or mounted on the vehicle and where the object data may comprise at lease the object location within the vehicle or on the vehicle (on the vehicle may be any device mounted outside the vehicle which may block the user view). The method may further calculate if the user LOS is intersecting at least one physical object received form the object database, the intersection calculation may be calculated as the user LOS vector may cross or intersect the object position or part of the object position. The physical object position may be provided by at least one coordinate and the object dimensions or be presented by plurality of points indicating the outer dimensions of the object. The method further may calculate an obstructed area within the user FOV caused by the object and needed to remove this obstruction. Generating the un-obstructed view may be extracted from the vehicle image captured by a sensor viewing the scene from a point of view not obstructed by the same object. The method may further extract from the vehicle image an un-obstructed data, the un-obstructed data may be extracted by extracting stream of pixels from the vehicle image or by extracting or cropping a ROI from the vehicle image. The method further according to step 905 may display the un-obstructed portion in the user FOV such that the obstructed portion (or pixels) is removed. In this embodiment the user is viewing the scene directly using a see through HMD and the un-obstructed view is overlaid on the real scene outside the vehicle.

Figure 10:
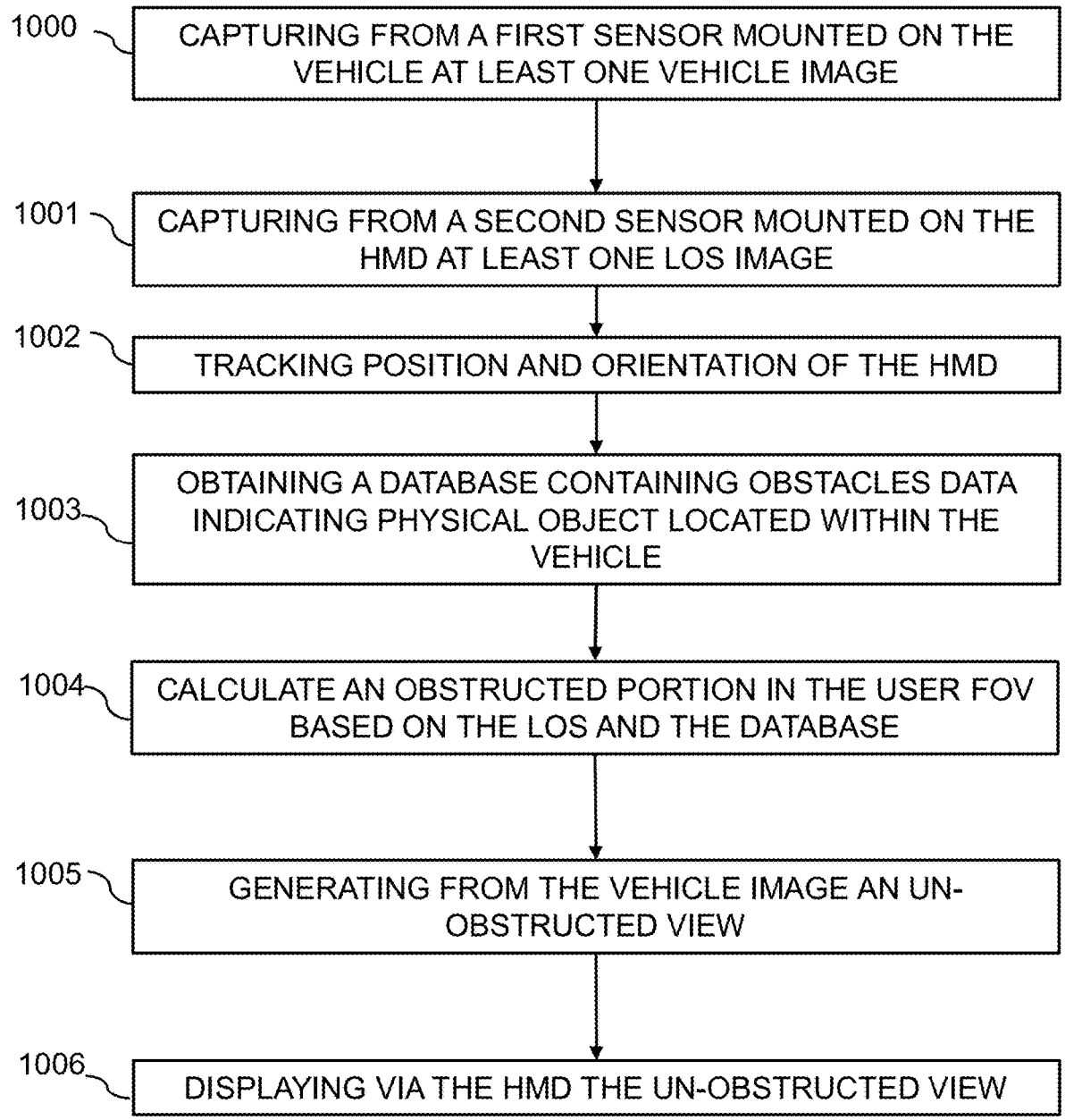
FIG. 10 is a flowchart of a method for generating and displaying to the user an unobstructed scene view, according to another embodiments.

FIG. 10 is a flowchart of a method for generating and displaying to the user wearing a HMD an un-obstructed view of the, according to a second embodiment. In this second embodiment a method for displaying the scene to a user wearing a head mounted display (HMD) while removing obstructions in a field of view (FOV) of the user viewing the scene and operating a vehicle is presented. Capturing in step 1000 by a first sensor at least one vehicle image of the scene wherein the first sensor may be mounted on the vehicle, step 1001 capturing by a second sensor mounted on HMD 22 a LOS image taken from the point of view of the second sensor which approximately may provide an image from the user point of view. Tracking in step 1002 the position and orientation of HMD 22 in a specified coordinate system thereby allowing to yield a line of sight (LOS) of the user wearing the HMD and the sensor. Obtaining in step 1003 a database containing obstacles data indicating at least one physical object located within the vehicle and affecting the FOV of the user. Calculating in step 1004 by a computing device, an obstructed portion in the FOV of the user viewing the scene based on the tracked LOS and the database. Generating in step 1005 from the vehicle image an un-obstructed view which comprises a portion of the scene overlapping the obstructed portion, displaying 1006 via the HMD the un-obstructed view to the user. In this embodiment the user wearing HMD 22 and viewing the outside scene via a second sensor mounted on the HMD (the second sensor may be a night vision sensor or any other sensor that may provide information outside the visible spectrum) where in some cases the scene in a specific LOS is obstructed by at least one physical object (such as canopy of the aircraft). The method may use a tracker to track the HMD position and orientation to yield the user line of sight (tracking the HMD or tracking the user head). The method may further receive at least one physical object data located within the vehicle or mounted on the vehicle and where the object data may comprise at lease the object location within the vehicle or on the vehicle (on the vehicle may be any device mounted outside the vehicle which may block the user view). The method may further calculate if the user LOS and hence the LOS image is intersecting at least one physical object received form the object database, the intersection calculation may be calculated as the user LOS vector may cross or intersect the object position or part of the object position. The physical object position may be provided by at least one coordinate and the object dimensions or be presented by plurality of points indicating the outer dimensions of the object. The method may calculate an obstructed area caused by the physical object positioned within the user FOV as viewed via the second sensor (image or video), to remove the obstruction the method in step 1005 may generate an un-obstructed view extracted from the vehicle image captured by the first sensor viewing the scene from a point of view not obstructed by the same object. The method may further extract from the vehicle image an un-obstructed data, the un-obstructed data may be extracted by extracting stream of pixels from the vehicle image or by extracting or cropping a ROI from the vehicle image. The method further according to step 1006 may display the un-obstructed portion in the user FOV such that the obstructed portion (or pixels) is removed. In this embodiment the user is viewing the scene via a second sensor and the un-obstructed view is overlaid on the LOS image. Although the embodiments in FIG. 9 and FIG. 10 are described separately a combination of the embodiments can yield to a user wearing the HMD a combined display of the outside scene as viewed both in a see-through manner via the HMD and in opaque manner via the second sensor.

As will be appreciated by one skilled in the art, aspects of the present invention may be embodied as a system, method or an apparatus. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The aforementioned flowchart and block diagrams illustrate the architecture, functionality, and operation of possible implementations of systems and methods according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not to be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention.

The invention claimed is:

1. A head mounted display (HMD) worn by a user, said HMD configured to remove obstructions in a field of view (FOV) of the user viewing a scene, said HMD comprising:
   a first sensor mounted on said vehicle in a first position, configured to capture at least one vehicle image of said scene;
   a tracker configured to track a position and orientation of said HMD in a specified coordinate system within the vehicle, to yield a line of sight (LOS) of said user wearing the HMD;
   a database containing obstacles data indicating at least one physical object located within said vehicle which is predicted to intersect the LOS of the user, wherein said obstacles data comprises a positional mapping of a plurality of physical objects affixed within said specified coordinate system; and
   a computer processor configured to predict future obstructed portion in said FOV of said user viewing the scene, based on the LOS of the user and said obstacles data, wherein the processor is further configured to prepare in advance, from said at least one vehicle image an un-obstructed view which comprises a portion of the scene overlapping the obstructed portion, wherein the processor is configured to calculate only pixels that are obstructed in the future obstructed portion within the scene and to replace only the obstructed pixels with a stream of pixels extracted from said at least one vehicle image, wherein said HMD is configured to display the un-obstructed view to said user, at the future obstructed portion, wherein said HMD comprises a see-through display configured to display the un-obstructed view overlaid on the scene while allowing the user to see the scene directly, and wherein said see-through display is coupled to a shutter configured to switch the see-through display from fully transparent mode to a fully opaque mode in specific areas where the user is expected to see the outside scene or the native systems of the vehicle.

2. The HMD according to claim 1, wherein a second sensor is mounted on said HMD and wherein the second sensor is configured to capture a LOS image of said scene from a position of said HMD.

3. The HMD according to claim 2, wherein said HMD is configured to display the un-obstructed view generated from the vehicle image overlaid on said LOS image.

4. The HMD according to claim 1, wherein said obstacles data corresponds to the position of the HMD in the specified coordinate system.

5. The HMD according to claim 2, wherein said processor generates the un-obstructed view from said at least one vehicle image by cropping from said at least one vehicle image an un-obstructed region of interest (ROI) and merging the ROI with at least one of: the LOS image and the scene viewed by said see-through display of said HMD.

6. The HMD according to claim 1, wherein a point of view of said first sensor is mounted on said vehicle is different from the point of view of the user.

7. The HMD according to claim 1, wherein the mapping includes at least one of: physical objects importance, physical objects colour, and physical objects texture.

8. The HMD according to claim 7, wherein said physical objects importance is indicated by at least one of: a user LOS designation and a predefined rules.

9. The HMD according to claim 1, wherein the mapping of physical objects affixed within the vehicle is generated by at least one of: predetermined model of the vehicle and real time mapping.

10. The HMD according to claim 9, wherein the real time mapping is done by the second sensor mounted on the HMD and generated with the natural user head movements.

11. The HMD according to claim 9, wherein the predetermined model of the vehicle includes at least the canopy model wherein the vehicle is an airborne vehicle.

12. The HMD according to claim 2, wherein at least one of: the first sensor and the second sensor are outside the visible spectrum.

13. A method for displaying a scene to a user wearing a head mounted display (HMD) while removing obstructions in a field of view (FOV) of the user viewing the scene, said method comprising:

capturing by a first sensor at least one vehicle image of the scene wherein the first sensor is mounted on a vehicle;

tracking a position and orientation of said HMD in a specified coordinate system within the vehicle, to yield a line of sight (LOS) of said user wearing the HMD;

obtaining by a computing device a database containing obstacles data indicating at least one physical object located within said vehicle which is predicted to intersect the LOS the user, wherein said obstacles data comprises a positional mapping of a plurality of physical objects affixed within said specified coordinate system;

predicting, by the computing device, a future obstructed portion in said FOV of said user viewing the scene based on the LOS of the user and said obstacles data;

preparing in advance, from said at least one vehicle image an un-obstructed view which comprises a portion of the scene overlapping the obstructed portion, wherein said preparing comprises calculating, by the computing device, only pixels that are obstructed in the future obstructed portion within the scene and replacing only the obstructed pixels with a stream of pixels extracted from said at least one vehicle image;

displaying in said HMD the un-obstructed view to the user, at the future obstructed portion;

displaying on a see-through display the un-obstructed view overlaid on the scene while allowing the user to see the scene directly; and switching the see-through display by a shutter coupled to the see-through display from fully transparent mode to a fully opaque mode in specific areas where the user is expected to see the outside scene or the native systems of the vehicle.

* * * * *